United States Patent [19]

Ohashi et al.

[11] Patent Number: 5,772,974
[45] Date of Patent: Jun. 30, 1998

[54] CARBONACEOUS ELECTRODE MATERIAL FOR BATTERY AND PROCESS FOR PRODUCTION THEREOF

[75] Inventors: Hiroaki Ohashi; Yoshiki Shigaki, both of Iwaki, Japan

[73] Assignee: Kureha Kagaku Kogyo Kabushiki Kaisha, Japan

[21] Appl. No.: 598,685

[22] Filed: Feb. 8, 1996

[30] Foreign Application Priority Data

Feb. 9, 1995 [JP] Japan ...................................... 7-044741

[51] Int. Cl.$^6$ ........................................................ D01F 9/12
[52] U.S. Cl. ................................... 423/447.7; 423/445 R; 423/449.4; 423/460; 423/447.2; 429/218; 429/213; 252/502; 252/503
[58] Field of Search ...................... 252/502, 503; 429/218, 212, 213; 423/445 R, 447.1, 447.2, 447.7, 449.4, 460

[56] References Cited

U.S. PATENT DOCUMENTS

| | | | |
|---|---|---|---|
| 4,271,242 | 6/1981 | Toyoguchi et al. | 429/218 |
| 4,765,968 | 8/1988 | Shia et al. | 423/445 R |
| 4,863,814 | 9/1989 | Mohri et al. | 429/60 |

FOREIGN PATENT DOCUMENTS

| | | |
|---|---|---|
| 0 201 038 A1 | 11/1986 | European Pat. Off. . |
| 0 248 386 A3 | 12/1987 | European Pat. Off. . |
| 0 700 106 | 3/1996 | European Pat. Off. . |

*Primary Examiner*—Bruce F. Bell

[57] ABSTRACT

A battery electrode material having a large charge-discharge capacity and capable of providing a (non-aqueous solvent-type secondary) battery of a high energy density is provided in the form of a carbonaceous material having a microtexture suitable for doping with lithium (ions). Such a carbonaceous material is produced through a process of heating a starting organic material for carbonization including a step of heating the organic material in a halogen gas-containing inert gas atmosphere in a specific temperature range (800°–1400° C.) below the final carbonization temperature.

7 Claims, 1 Drawing Sheet

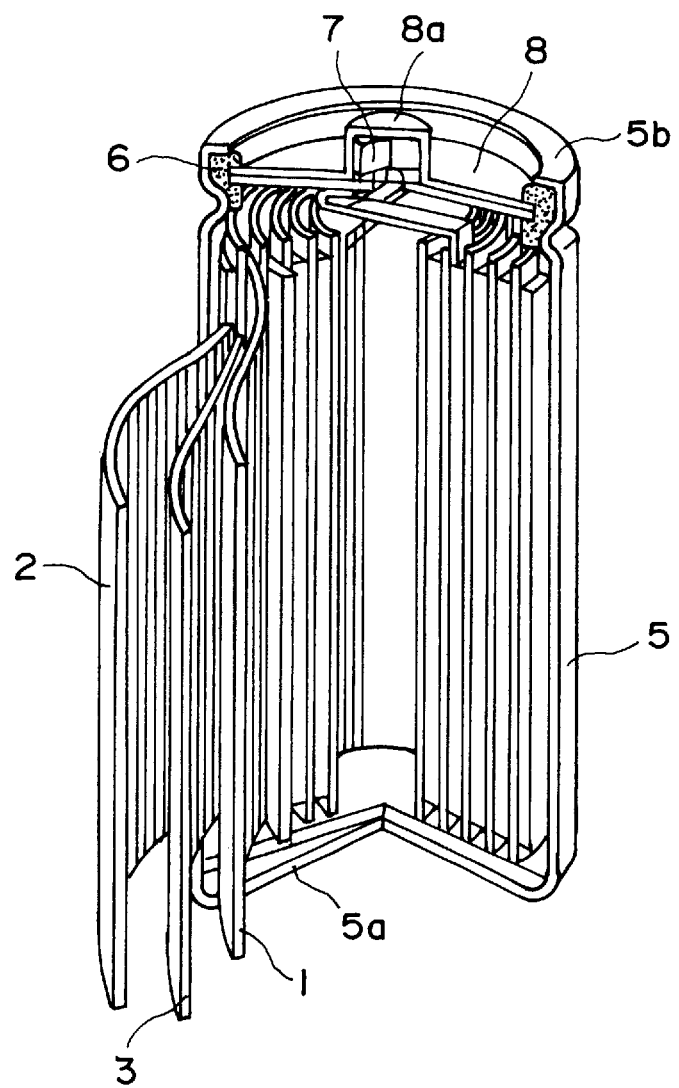
F I G. 1
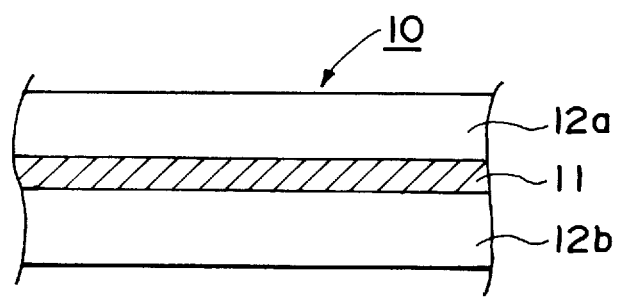
F I G. 2 ary battery, and
more particularly to a carbonaceous material suitable as an
electrode material for a high-energy density non-aqueous
solvent-type (secondary) battery because of a high effective
utilization rate represented by a large doping-dedoping
capacity of a cell active substance and an excellent charge-
discharge cycle characteristic. The present invention also
relates to a process for producing such a carbonaceous
electrode material, an electrode structure comprising such a
carbonaceous electrode material, and a non-aqueous
solvent-type secondary battery having such an electrode
structure.

There has been proposed a non-aqueous solvent-type
lithium (Li) secondary battery having a negative electrode
comprising a carbonaceous material as a secondary battery
of a high energy density (e.g., in Japanese Laid-Open Patent
Application (JP-A) 62-90863, JP-A 62-122066 and JP-A
2-66856). If such a battery is charged, lithium in a lithium
chalcogenide, such as $LiCoO_2$, stored in a positive electrode
is electro-chemically released to dope a carbonaceous nega-
tive electrode. The lithium doping (i.e., stored in) the car-
bonaceous negative electrode is de-doped (i.e., released)
from the carbonaceous negative electrode during discharge
to return into the positive electrode.

A carbonaceous material as such a negative electrode
material or a carbonaceous material as a positive electrode
material doped with lithium (ions), provides an electric
capacity (an available electricity per unit weight) determined
by its (doping and) de-doping capacity (i.e., an amount of
(storable and) releasable lithium (or lithium ions) during
discharge), so that a carbonaceous material having large
doping and de-doping capacities for lithium (ions) has been
strongly desired.

Processes for producing carbonaceous materials have
been disclosed in JP-A 62-90863, inclusive of (1) process of
subjecting a carbon-source compound, such as benzene,
methane or carbon monoxide to gaseceous-phase pyrolysis
(at a temperature of, e.g., 600°–1500° C.) in the presence of
a transition metal catalyst, etc., (2) a process of calcining and
carbonizing pitches in an atmosphere of inert gas, such as
argon, at a temperature of 600°–2400° C., and (3) a process
of calcining and carbonizing a polymer consisting princi-
pally of acrylonitrile in an atmosphere of inert gas, such as
argon, at a temperature of 600°–2400° C.

JP-A 62-122066 discloses (4) a process for producing a
carbonaceous material by calcining an organic polymeric
compound, such as cellulosic resin, phenolic resin, or poly-
acrylonitrile; a condensed polycyclic hydrocarbon
compound, such as naphthalene, phenanthrene, anthracene
or various types of pitch; a polycyclic heterocyclic
compound, such as indole, quinoline or phthalazine; etc.,
under vacuum or under a stream of inert gas, such as
nitrogen or argon, at 500°–3000° C.

JP-A 2-66856 discloses (5) a process for producing a
carbonaceous material by calcining furan resin in a nitrogen
gas stream.

SUMMARY OF THE INVENTION

An object of the present invention is to provide a carbon-
aceous material for (secondary) battery electrode having
large charge-discharge capacities and capable of providing a
non-aqueous solvent-type (secondary) battery.

Another object of the present invention is to provide a
process for producing such a carbonaceous material as
described above.

A further object of the present invention is to provide an
electrode structure comprising such a carbonaceous material
and a battery including the electrode structure.

As described hereinbefore, a carbonaceous material has
been generally produced by treating a starting organic mate-
rial in an inert gas atmosphere at a temperature of
600°–3000° C. to carbonize the material.

It is well known that the properties of the resultant
carbonaceous material vary depending on the kind of the
starting organic material, the presence or absence of modi-
fying treatment (oxidation, etc.) of the starting organic
material, the carbonization conditions (temperature,
atmosphere, etc.), etc.

According to our study, it has been discovered that a
carbonaceous electrode material capable of providing a
non-aqueous solvent-type secondary battery having a large
charge-discharge capacity can be produced through a pro-
cess of carbonizing a starting organic material under heating
including a step of heating the starting organic material in an
atmosphere containing a halogen gas, such as chlorine gas,
and that the resultant carbonaceous material has a micro-
texture suitable to be doped with lithium (ions) and has an
appropriate level of residual halogen content.

Thus, according to the present invention, there is provided
a carbonaceous material for battery electrode, comprising a
carbonaceous material having a micro-texture suitable for
doping with lithium and a halogen content of 50–10000
ppm.

According to the present invention, there is further pro-
vided a process for producing a carbonaceous material for
battery electrode, comprising a heating process of heating a
starting organic material to produce a carbonaceous
material, wherein said heating process includes a step of
heating the starting organic material in a halogen gas-
containing inert gas atmosphere at a temperature in a range
of 800°–1400° C.

According to another aspect of the present invention,
there is provided a battery electrode structure, comprising:
an electroconductive substrate and a composite electrode
layer disposed on at least one surface of the electroconduc-
tive substrate; the composite electrode layer comprising a
carbonaceous material as described above in a particulate
form, and a binder.

According to a further aspect of the present invention,
there is provided a battery, comprising, a positive electrode,
a negative electrode, and an electrolyte disposed between the
positive and negative electrodes; at least one of the positive
and negative electrodes comprising an electrode structure as
described above.

These and other objects, features and advantages of the
present invention will become more apparent upon a con-
sideration of the following description of the preferred
embodiments of the present invention taken in conjunction
with the accompanying drawings.

BRIEF DESCRIPTION OF THE DRAWING

FIG. 1 is a partially exploded perspective view of a
non-aqueous solvent-type secondary battery which can be
constituted according to the invention.

FIG. 2 is a partial sectional view of an electrode structure
adopted in the secondary battery.

DETAILED DESCRIPTION OF THE INVENTION

Examples of the starting organic material used as a starting material for producing the carbonaceous material according to the present invention (which may be accordingly inclusively referred to as a carbon precursor) may include: natural polymeric substances, such as coconut shell and wood; synthetic thermosetting resins, such as phenolic resin and furan resin; synthetic thermoplastic resins, such as polyacrylonitrile and polyvinyl chloride; and polycyclic aromatic compounds, such as pitch and tar. It is also possible to suitably use a modified carbon precursor, e.g., as obtained by subjecting a carbon precursor, such as polyacrylonitrile, pitch or tar, to a modifying pre-treatment, such as oxidation.

In the carbonaceous material production process according to the present invention, it is preferred to use a carbon precursor generally used for providing so-called nongraphitizable carbon inclusive of: natural polymeric substances, such as coconut shell and wood; synthetic thermosetting resins, such as phenolic resin and furan resin; and modified carbon precursor, such as polyacrylonitrile, pitch and tar pre-treated by oxidation.

Particularly remarkable effects of the present invention may be achieved by using, as a starting organic material, oxidized pitch obtained through a process including the steps of: melt-mixing petroleum pitch or coal pitch under heating with an additive comprising one or more species of aromatic compounds having two or three cyclic rings and a boiling point of at least 200° C. to form a shaped pitch product; removing the additive from the shaped pitch product by extraction with a solvent having a low dissolving power for the pitch and a high dissolving power for the additive to form a porous pitch, and oxidizing the porous pitch. Such an additive may more specifically be selected as a single species or a mixture of two or more species selected from, e.g., naphthalene, methylnaphthalene, phenylnaphthalene, benzylnaphthalene, methylanthracene, phenanthrene, and biphenyl. The additive may preferably be added in a proportion of 30–70 wt. parts per 100 wt. parts of the pitch.

The mixing of the pitch and the additive may suitably be performed in a molten state under heating in order to achieve uniform mixing. The resultant mixture of the pitch and additive may preferably be shaped into particles of at most 1 mm in diameter so as to facilitate the extraction of the additive from the mixture. The shaping may be performed in a molten state or by pulverization of the mixture after cooling.

Suitable examples of the solvent for removal by extraction of the additive from the mixture of the pitch and the additive may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that pores are formed at sites from which the additive is removed, thereby providing a uniformly porous pitch product.

The thus-obtained porous pitch product is then oxidized. The oxidation may preferably be performed at a temperature of from room temperature to 400° C. by using an oxidizing agent. Examples of the oxidizing agent may include: oxidizing gases, such as $O_2$, $O_3$, $SO_3$, $NO_2$, mixture gases formed by these gases diluted with, e.g., air or nitrogen, and air; and oxidizing liquids, such as sulfuric acid, phosphoric acid, nitric acid, and hydrogen peroxide aqueous solution.

The oxidation of the porous pitch may conveniently be performed by using an oxygen-containing gas, such as air or a gaseous mixture of air with another gas such as combustion gas, at 120°–300° C. This is also economically advantageous.

The above-mentioned starting organic material is heated for carbonization to provide a carbonaceous material. The process according to the present invention is characterized by including a step of heating the starting organic material in a gaseous mixture atmosphere containing an inert gas and a halogen gas. The operation of heating the starting organic material in such a gaseous mixture is referred to as "halogen gas treatment" herein.

The halogen gas treatment may be performed within an appropriately set temperature range which is equal to or below the final carbonization temperature, more specifically within a temperature range of 800°–1400° C., preferably 800°–1300° C., more preferably 850°–1200° C.

The halogen gas may include chlorine gas, bromine gas, iodine gas and fluorine gas, but chlorine gas is particularly preferred. Examples of the inert gas may include: nitrogen gas, argon gas and helium gas. It is also possible to supply a substance (halogen precursor) capable of generating a halogen gas at an elevated temperature, such as $CCl_4$ or $Cl_2F_2$, in mixture with an inert gas as a carrier.

Incidentally, as a somewhat similar process of treating a carbon material with a halogen gas, there has been known a purification treatment of heating a carbon material (containing a metallic impurity) at a temperature of 2000° C. or higher in an inert gas atmosphere while introducing chlorine gas, so that the metal impurity is reacted with the chlorine gas at such a high temperature to form a chloride, which is removed by sublimation (e.g., Takeshi TAKEI, et al "Science of New Industrial Material, A-8, Carbon and Graphite Products" (in Japanese) p.p. 82–85, published from Kimbara Shuppan K. K. (October 1967)).

The halogen gas treatment of the present invention is performed at a temperature of at most 1400° C. and is different from such a purification treatment requiring a high temperature of 2000° C. or higher. It has been confirmed that, even if a halogen gas treatment is performed at a high temperature of 2000° C. or higher as in the purification treatment, the halogen element (e.g., chlorine) cannot be introduced into the resultant carbonaceous material so that no improvement in battery performance can be attained by using the resultant carbonaceous material.

The carbonization in the process of the present invention may be performed by heating the starting organic material at continuously elevated temperatures up to a final carbonization temperature (900°–1500° C.), or by once subjecting the starting organic material to preliminary carbonization at a temperature (e.g., below 800° C.) lower than the final carbonization temperature, followed by final carbonization at a higher temperature. More specifically, in the latter process, the starting organic material may be pre-carbonized at 350°–700° C. in an inert gaseous atmosphere (e.g., in a gas atmosphere of nitrogen, argon, etc., or under a reduced pressure). The pre-carbonized product may be pulverized into a fine powdery carbon precursor having an average particle size of 100 μm or smaller, preferably 50 μm or smaller. Then, the fine powdery carbon precursor may be subjected to the halogen gas treatment and then to the final carbonization to produce a powdery carbonaceous material.

The use of such a fine powdery carbon precursor is preferred because it allows a uniform halogen gas treatment.

The carbonization including the halogen gas treatment step according to the present invention may be performed by using a heating furnace used for production of ordinary carbonaceous materials, such as a fixed bed-type heating furnace, a moving bed-type heating furnace, a fluidized bed-type heating furnace, or a rotary kiln.

In the case of a batch-wise treatment using a fixed bed-type heating furnace or a rotary kiln, the starting organic material may be first charged in the furnace and gradually elevating the temperature in the furnace while causing an inert gas to flow through the furnace. When the furnace temperature reaches a prescribed lower limit temperature for the halogen gas treatment, the inert gas is exchanged with an inert gas containing a halogen gas (in a sense of including a halogen-generating gas) to effect the halogen gas treatment while continuing the temperature elevation. When the furnace temperature reaches a prescribed upper limit temperature for the halogen gas treatment. The supply of the halogen gas is terminated, and the furnace temperature is further elevated up to a final carbonization temperature while causing only an inert gas to flow, followed by cooling to recover a carbonaceous material. The final carbonization temperature may be equal to or higher than the upper limit temperature for the halogen gas treatment, and may preferably be 1500° C. or below.

In the case of continuous carbonization by using a moving bed-type heating furnace, the starting organic material or carbon precursor may be allowed to contact a halogen gas-containing inert gas while it is in an appropriate temperature region in the range of 800°–1400° C. in the furnance to effect the halogen gas treatment.

The quantity of the halogen gas supplied may preferably be determined experimentally but may be roughly on the order of 0.2–2 mol per kg of the starting organic material. Further, the halogen gas concentration in the halogen gas-containing inert gas supplied to the furnace may be on the order of 4–40 mol %. The halogen gas concentration can be constant throughout the halogen gas treatment but may preferably be relatively high in a low-temperature region and relatively low in a high-temperature region.

As a result of the above-mentioned carbonization process including the halogen gas treatment step, the carbonaceous material according to the prevent invention may be provided with a microtexture suitable for doping with lithium (ions) and a prescribed level of halogen content.

The above-mentioned micro-texture may be represented by an average (002) plane-spacing $d_{002}$ as measured by X-ray diffraction method of 0.365–0.400 nm, preferably 0.370–0.395 nm. The carbonaceous material may further preferably have a crystallite size in c-axis direction Lc of at most 15 nm, a true density of 1.45–1.65 g/cm$^3$, and an H/C atomic ratio of at most 0.10.

The carbonaceous material according to the present invention is further characterized by a halogen content of 50–10000 ppm (by weight), preferably 100–5000 ppm, further preferably 200–3000 ppm. The halogen content can be increased by increasing the halogen gas concentration in the treatment gas for the halogen gas treatment, but a higher halogen content in excess of a certain level may not lead to a further improvement in performance of the resultant battery.

The carbonaceous material according to the present invention has a micro-texture suitable for doping with lithium (ions) and is suitably used as an electrode material for lithium batteries constituting a negative electrode or a positive electrode, as desired. Of these, the carbonaceous material may preferably be used as an electrode material for a non-aqueous solvent-type secondary battery, particularly for constituting a negative electrode of a non-aqueous solvent-type lithium secondary battery to be doped with lithium (ions) as an active substance of the negative electrode.

FIG. 1 is a partially exploded perspective view of a non-aqueous solvent-type lithium secondary battery as an embodiment of a battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, steel, aluminum, nickel or titanium and having a thickness of, e.g., 5–100 μm, or 5–20 μm for a small-sized battery, and a composite electrode layer (12a, 12b) of, e.g., 10–1000 μm, preferably 10–200 μm, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention, an electroconductive material such as electroconductive carbon, optionally included, and a binder such as a vinylidene fluoride resin.

More specifically, in case of using the carbonaceous material according to the present invention for producing an electrode 10 (FIG. 2; corresponding to 1 or 2 in FIG. 1) of a non-aqueous solvent-type secondary battery as described above, the carbonaceous material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 μm-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate is liable to be insufficient. The above described formulation and values have been set forth with respect to production of a secondary battery of a relatively small capacity, whereas, for production of a secondary battery of a larger capacity, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide, such as $LiCoO_2$, $LiNiO_2$ or $LiMnO_4$. Such a positive electrode material may be formed in combination with an appropriate binder and a carbonaceous material into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, LiCl, LiBr, $LiB(C_6H_5)_4$, and $LiN(SO_2CF_3)_2$.

As described above, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrode layers optionally together with a liquid-permeable separator in an electrolytic solution as described above (FIG. 1).

Incidentally, the parameters, an average (002) plane-spacing $d_{002}$, true density and chlorine content (as an example of halogen content) characterizing a carbonaceous material described herein are based on the measurement or test performed in the following manner:

[$d_{002}$ of carbonaceous material].

A powdery sample of a carbonaceous material is packed in an aluminum-made sample cell and is irradiated with monochromatic CuKα rays (wavelength=0.15418 nm) through a graphite monochromator to obtain an X-ray diffraction pattern according to a reflection-type defractometer method. The correction of a diffraction pattern is performed only with respect to corrections of $K\alpha_1$–$K\alpha_2$ doublet according to the Rachinger's method and without correction with respect to the Lorentz's polarization factor, absorption factor, atomic scattering factor, etc. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$d_{002}=\lambda/(2 \cdot \sin \theta)$ (Bragg's formula)

[True density of carbonaceous material]

Measured pycnometrically according to the butanol method prescribed in JIS R7212.

[Chlorine content of carbonaceous material]

A sample carbonaceous material is burnt by using an oxyhydrogen flame burner ("Wickbold V5", available from Heraeus Co.), and HCl in the resultant burnt gas is absorbed in a 0.01 mol-NaOH aqueous solution. Then, the chlorine content in the solution is quantified by an ion chromatography analyzer ("Model DX-300", available from DIONEX Co.). In advance, a calibration curve for the ion chromatography analyzer is prepared by using solutions having chlorine concentrations of 20, 100 and 500 ppm, respectively, which may be prepared by diluting a standard sodium chloride aqueous solution (e.g., a chlorine ion standard solution for ion chromatography, having a chlorine ion concentration of 1000 ppm, available from Kanto Kagaku K. K.).

EXAMPLES

Hereinbelow, the present invention will be described more specifically with reference to Examples and Comparative Examples, wherein gas flow rates are expressed based on volumes under the standard state (0° C., 1 atm).

Example 1

70 kg of a petroleum pitch having a softening point of 205° C. and an H/C atomic ratio of 0.65, and 30 kg of naphthalene, were placed in a 300 liter-pressure-resistant vessel equipped with stirring blades and an outlet nozzle, melt-mixed under heating at 190° C. and, after being cooled to 80°–90° C., extruded through the outlet nozzle by increasing the pressure within the vessel by nitrogen introduction to form an about 500 μm dia.-string-shaped product. Then, the string-shaped product was broken so as to provide a length (L)-to-diameter (D) ratio (L/D) of about 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres. The thus-obtained porous spherical pitch was heated to 270° C. in a fluidized bed while feeding heated air and held at 270° C. for 1 hour to be oxidized into a thermally-infusible porous spherical oxidized pitch product.

Then, the oxidized pitch was heated to 600° C. in a nitrogen gas atmosphere (normal pressure) and held at 600° C. for 1 hour for pre-carbonization to obtain a carbon precursor having a volatile content of at most 2%. The carbon precursor was pulverized into a powdery carbon precursor having an average particle size of ca. 25 μm.

Then, 30 g of the powdery carbon precursor was placed on a perforated plate disposed at a middle height in a vertical reaction tube of a vertical tubular furnace and was heated at a temperature-raising rate of 10° C./min while feeding nitrogen gas at a rate of 100 ml/min from a lower part of the reaction tube. When the furnance temperature reached 900° C., the feed gas was switched to a mixture gas of 67 ml/min of nitrogen gas and 33 ml/min of chlorine gas to continue the heating and, when the temperature reached 1000° C., the feed gas was switched to a mixture gas of 83 ml/min of nitrogen gas and 17 ml/min of chlorine gas to continue the heating up to a furnace temperature of 1100° C. When the furnance temperature reached 1100° C., the feed of the chlorine gas was terminated, and the temperature was held at 1100° C. for 1 hour to effect carbonization while feeding 100 ml/min of nitrogen gas, followed by cooling to prepare a powdery carbonaceous material.

Example 2

A powdery carbonaceous material was prepared from 30 g of the powdery carbon precursor obtained in Example 1 by heat-treating the carbon precursor in the same manner as in Example 1 except for changing the feed gas supply conditions as follows.

The feed gas was 400 ml/min of nitrogen gas up to a furnace temperature of 900° C., a mixture gas of 367 ml/min of nitrogen gas and 33 ml/min of chlorine gas for a furnace temperature range of 900°–1000° C., a mixture gas of 383 ml/min of nitrogen gas and 17 ml/min of chlorine gas for a furnace temperature range of 1000°–1100° C., and 400 ml/min of nitrogen gas after reaching the furnace temperature of 1100° C.

Comparative Example 1

A powdery carbonaceous material was prepared in the same manner as in Example 1 except that no chlorine gas was supplied and nitrogen gas was fed at a constant rate of 100 ml/min throughout the heat-treatment.

Example 3

Phenolic resin ("Cashew No. 5"; available from Cashew K. K.) was compression-molded at 150° C., heated in a nitrogen gas stream at a temperature-raising rate of 200° C./hour up to 600° C. and held at 600° C. for 5 hours, followed by cooling and pulverization down to an average particle size of ca. 25 μm to obtain a powdery carbon precursor.

The carbon precursor was heat-treated for carbonization in the same manner as in Example 1 to obtain a carbonaceous material.

Comparative Example 2

A powdery carbonaceous material was prepared in the same manner as in Example 3 except that no chlorine gas was supplied and nitrogen gas was fed at a constant rate of 100 ml/min throughout the heat-treatment.

Example 4

Furan resin ("Hitafuran VF-303", available from Hitachi Kasei K. K.), after being cured, was heated in a nitrogen gas stream at a temperature-raising rate of 200° C./hour up to 600° C. and held at 600° C. for 5 hours, followed by cooling and pulverization down to an average particle size of ca. 25 μm to obtain a powdery carbon precursor.

The carbon precursor was heat-treated for carbonization in the same manner as in Example 1 to obtain a carbonaceous material.

Comparative Example 3

A powdery carbonaceous material was prepared in the same manner as in Example 4 except that no chlorine gas was supplied and nitrogen gas was fed at a constant rate of 100 ml/min throughout the heat-treatment.

Example 5

Coconut shell char ("Yashibon No. 2", available from Kuraray Chemical K. K.) was pulverized to obtain a powdery carbon precursor having an average particle size of ca. 25 μm, which was heat-treated in the same manner as in Example 1 to prepare a carbonaceous material.

Comparative Example 4

A powdery carbonaceous material was prepared in the same manner as in Example 5 except that no chlorine gas was supplied and nitrogen gas was fed at a constant rate of 100 ml/min throughout the heat-treatment.

Example 6

A powdery carbonaceous material was prepared from 30 g of the powdery carbon precursor obtained in Example 1 by heat-treating the carbon precursor in the same manner as in Example 1 except for changing the feed gas supply conditions as follows.

The feed gas was 200 ml/min of nitrogen gas up to a furnace temperature of 900° C., a mixture gas of 134 ml/min of nitrogen gas and 66 ml/min of chlorine gas for a furnace temperature range of 900°–1000° C., a mixture gas of 167 ml/min of nitrogen gas and 33 ml/min of chlorine gas for a furnace temperature range of 1000°–1100° C., and 200 ml/min of nitrogen gas after reaching the furnace temperature of 1100° C.

Example 7

A powdery carbonaceous material was prepared from 30 g of the powdery carbon precursor obtained in Example 1 by heat-treating the carbon precursor in the same manner as in Example 1 except for changing the feed gas supply conditions as follows.

The feed gas was 200 ml/min of nitrogen gas up to a furnace temperature of 900° C., a mixture gas of 134 ml/min of nitrogen gas and 66 ml/min of chlorine gas for a furnace temperature range of 900°–1000° C., a mixture gas of 167 ml/min of nitrogen gas and 33 ml/min of chlorine gas for a furnace temperature range of 1000°–1100° C., a mixture gas of 183 ml/min of nitrogen gas and 17 ml/min of chlorine gas for a furnace temperature range of 1100°–1200° C., and 200 ml/min of nitrogen gas after reaching the furnace temperature of 1200° C.

Comparative Example 5

A powdery carbonaceous material was prepared in the same manner as in Example 7 except that no chlorine gas was supplied and nitrogen gas was fed at a constant rate of 100 ml/min throughout the heat-treatment.

Comparative Example 6

An induction heating furnace using graphite as a heat-generating member and capable of being made airtight was provided, and 30 g of the powdery carbon precursor obtained in Example 1 and placed in a graphite-made crucible was disposed at the center of the furnace. The carbon precursor in the furnace was heated at a rate of 10° C./min up to 2000° C. while feeding nitrogen gas into the furnace at a rate of 100 ml/min. On reaching 2000° C., the feed gas was switched to a mixture gas of 83 ml/min of nitrogen gas and 17 ml/min of chlorine gas, and the furnace was held at that temperature for 1 hour. Then, the feed gas was returned to 100 ml/min of nitrogen gas, followed by cooling, to prepare a powdery carbonaceous material.

Comparative Example 7

A powdery carbonaceous material was prepared in the same manner as in Comparative Example 6 except that no chlorine gas was supplied and nitrogen gas was fed at a constant rate of 100 ml/min throughout the heat-treatment.

Comparative Example 8

150 g of vinylidene chloride resin (as a food-packaging material, available from Kureha Kagaku Kogyo K. K.) was placed in an alumina-made crucible and disposed at the center of a high-density alumina-made horizontal calcination furnace, and the atmosphere inside the furnace was aerated with nitrogen. Thereafter, the furnace was heated at a rate of 4° C./min up to 600° C. while feeding nitrogen gas at a rate of 10 ml/min. On reaching 600° C., the furnace was held at 600° C. for 1.5 hours while continuing the nitrogen feed and then cooled to provide a preliminarily carbonized carbon precursor, followed by pulverization. Then, 20 g of the resultant powdery carbon precursor having an average particle size of 20 μm was placed in an alumina-made crucible and disposed at the center of the horizontal furnace, followed by aeration of the furnace with nitrogen. After the aeration, the furnace was heated up to 1200° C. at a rate of 4° C./min. On reaching 1200° C., the temperature was held at 1200° C. for 1 hour while continuing the nitrogen feed, followed by cooling to prepare a carbonaceous material.

The properties (true density, (002) plane-spacing $d_{002}$ and chlorine content) of the carbonaceous materials prepared in the above Examples and Comparative Examples are inclusively shown in the following Table 1 together with the induction of starting organic materials.

TABLE 1

Properties of carbonaceous material

| | Starting organic material | True density ($g/cm^3$) | $d_{002}$ (nm) | Chlorine content (ppm) |
|---|---|---|---|---|
| Ex. 1 | petroleum pitch | 1.53 | 0.379 | 150 |
| Ex. 2 | petroleum pitch | 1.52 | 0.380 | 1100 |
| Ex. 6 | petroleum pitch | 1.53 | 0.388 | 1190 |
| Comp. Ex. 1 | petroleum pitch | 1.53 | 0.379 | 0 |
| Ex. 7 | petroleum pitch | 1.54 | 0.380 | 1260 |
| Comp. Ex. 5 | petroleum pitch | 1.54 | 0.380 | 0 |
| Ex. 3 | phenolic resin | 1.49 | 0.389 | 1020 |
| Comp. Ex. 2 | phenolic resin | 1.48 | 0.388 | 0 |
| Ex. 4 | furan resin | 1.47 | 0.385 | 1100 |
| Comp. Ex. 3 | " | 1.47 | 0.385 | 0 |
| Ex. 5 | coconut shell | 1.48 | 0.374 | 840 |
| Comp. Ex. 4 | coconut shell | 1.47 | 0.375 | 0 |
| Comp. Ex. 6 | petroleum pitch | 1.54 | 0.365 | 0 |
| Comp. Ex. 7 | petroleum pitch | 1.55 | 0.365 | 0 |
| Comp. Ex. 8 | vinylidene chloride resin | 1.48 | 0.390 | 0 |

[Doping/de-doping capacity for active substance]

The carbonaceous materials obtained in Examples and Comparative Examples were respectively used to prepare a non-aqueous solvent-type secondary battery (cell) and the performances thereof were evaluated in the following manner.

The carbonaceous material of the present invention is generally suited for constituting a negative electrode of a non-aqueous solvent secondary battery. However, in order to accurately evaluate the performances of a carbonaceous material inclusive of a doping capacity (A) and a de-doping capacity (B) for a cell active substance and also an amount of the cell active substance remaining in the carbonaceous material without being dedoped ("irreversible capacity" (A-B)) without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode was prepared as follows. That is, 90 wt. parts of the carbonaceous material thus formulated in the form of fine particles and 10 wt. parts of polyvinylidene fluoride were mixed together with N-methyl-2-pyrrolidone to form a paste-like composite, which was then applied uniformly onto a copper foil. The composite, after being dried, was peeled off the copper foil and stamped into a 21 mm-dia. disk. The disk was then press-bonded onto a 21 mm-dia. circular shaped net of stainless steel to form a positive electrode containing about 40 mg of the carbonaceous material. On the other hand, a negative electrode was prepared by stamping a 1 mm-thick sheet of lithium metal into a 21 mm-dia. disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and $LiClO_4$ dissolved therein at a rate of 1 mol/liter, thereby forming a non-aqueous solvent-type lithium secondary battery.

In the lithium secondary battery thus constituted, the carbonaceous material in the positive electrode was subjected to doping and dedoping of lithium to evaluate capacities therefor.

More specifically, the doping was effected by repeating a cycle including 1 hour of current conduction at a current density of 0.5 $mA/cm^2$ and 2 hours of pause until the equilibrium potential between the positive and negative electrodes reached 5 mV. The electricity thus flowed was divided by the weight of the carbonaceous material to provide a doping capacity (A) in terms of mAh/g. Then, in a similar manner, a current was flowed in a reverse direction to dedope the lithium from the doped carbonaceous material. The de-doping was effected by repeating a cycle including 1 hour of current conduction at a current density of 0.5 $mA/cm^2$ and 2 hours of pause, down to a cut-off voltage of 1.5 volts. The electricity thus flowed was divided by the weight of the carbonaceous material to provide a dedoping capacity (B) in terms of mAh/g. Then, an irreversible capacity (A-B) was calculated as a difference between the doping capacity (A) and the dedoping capacity (B).

The performances of the lithium secondary batteries using positive electrodes of the respective carbonaceous materials measured in the above-described manner are summarized in the following Table 2.

TABLE 2

Secondary battery performances

| | Doping capacity (A) [mAh/g] | Dedoping capacity (B) [mAh/g] | Irreversible capacity (A–B) [mAh/g] |
|---|---|---|---|
| Ex. 1 | 457 | 350 | 107 |
| Ex. 2 | 529 | 427 | 102 |
| Ex. 6 | 529 | 425 | 104 |
| Comp. Ex. 1 | 434 | 331 | 103 |
| Ex. 7 | 512 | 422 | 90 |
| Comp. Ex. 5 | 443 | 354 | 89 |
| Ex. 3 | 506 | 334 | 172 |
| Comp. Ex. 2 | 485 | 315 | 170 |

TABLE 2-continued

Secondary battery performances

|  | Doping capacity (A) [mAh/g] | Dedoping capacity (B) [mAh/g] | Irreversible capacity (A–B) [mAh/g] |
|---|---|---|---|
| Ex. 4 | 460 | 336 | 124 |
| Comp. Ex. 3 | 433 | 313 | 120 |
| Ex. 5 | 478 | 350 | 128 |
| Comp. Ex. 4 | 446 | 324 | 122 |
| Comp. Ex. 6 | 226 | 181 | 45 |
| Comp. Ex. 7 | 223 | 181 | 42 |
| Comp. Ex. 8 | 600 | 146 | 454 |

As is clear from Table 2, the carbonaceous materials of Examples (i.e., those prepared through a process of carbonization of starting organic materials including a step of heating the material in an inert gas atmosphere containing a halogen gas) respectively showed doping and de-doping capacities which were both increased compared with the corresponding Comparative Examples (i.e., those prepared through a conventional process not including such a halogen gas treatment from the identical starting organic materials), so that they showed excellent performances as carbonaceous materials for secondary batteries.

As described above, according to the present invention, it is possible to provide a carbonaceous material having a micro-texture suitable for doping with a cell active substance, particularly lithium (ions) and also having an appropriate level of halogen content by carbonizing a starting organic material through a process including a halogen gas treatment step in a specific temperature range. The carbonaceous material has an increased capacity for doping with an active substance which is generally advantageous for providing a battery electrode structure and also has an increased de-doping capacity particularly useful for constituting an electrode structure for a non-aqueous solvent secondary battery. Accordingly, by constituting an electrode, particularly a negative electrode with the carbonaceous material, it is possible to provide a battery, particularly a lithium secondary battery, having a high-energy density.

What is claimed is:

1. A carbonaceous material for secondary battery electrodes, comprising a carbonaceous material having a halogen content of 50–10000 ppm and a micro-texture suitable for doping with and dedoping of lithium including an average (002) plane-spacing of 0.365–0.400 nm as measured by X-ray diffraction method.

2. The carbonaceous material according to claim 1 which has been obtained through a heating process of heating a starting organic material to produce a carbonaceous material, wherein said heating process includes a step of heating the starting organic material in a halogen gas-containing inert gas atmosphere at a temperature in a range of 800°–1400° C.

3. The carbonaceous material according to claim 2, wherein said starting organic material comprises a carbon precursor obtained by: mixing a pitch of a petroleum or coal origin with an additive comprising an aromatic compound having two or three aromatic rings and a boiling point of at least 200° C. to form a shaped pitch product; extracting the additive from the shaped pitch product with a solvent showing a low dissolving power to the pitch and a high dissolving power to the additive, thereby to leave a porous pitch product; and oxidizing the porous pitch product.

4. The carbonaceous material according to claim 1, wherein said halogen gas is chlorine gas.

5. The carbonaceous material according to claim 1, wherein the carbonaceous material has a chlorine content of 50–10000 ppm.

6. A battery electrode structure, comprising: an electroconductive substrate and a composite electrode layer disposed on at least one surface of the electroconductive substrate;

said composite electrode layer comprising a carbonaceous material according to any one of claims 1, 2 to 4 and 5 in a particulate form, and a binder.

7. A battery, comprising, a positive electrode, a negative electrode, and an electrolyte disposed between the positive and negative electrodes;

at least one of said positive and negative electrodes comprising an electrode structure according to claim 6.

* * * * *